Feb. 25, 1930. H. E. CRUM 1,748,637
ELECTRICIAN'S SAFETY KNIFE
Filed Dec. 29, 1926
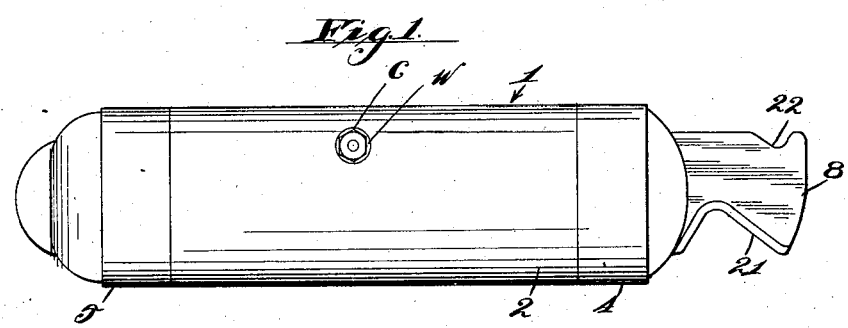
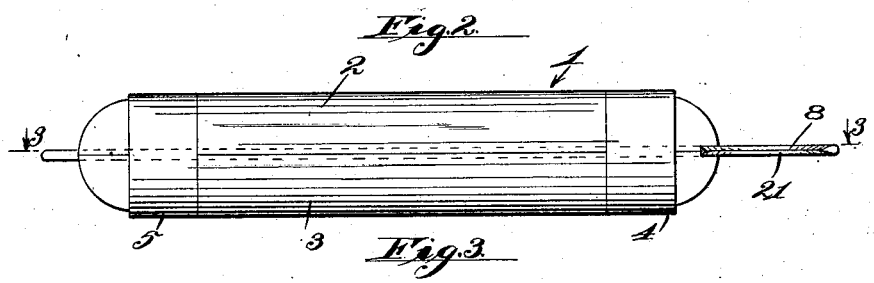
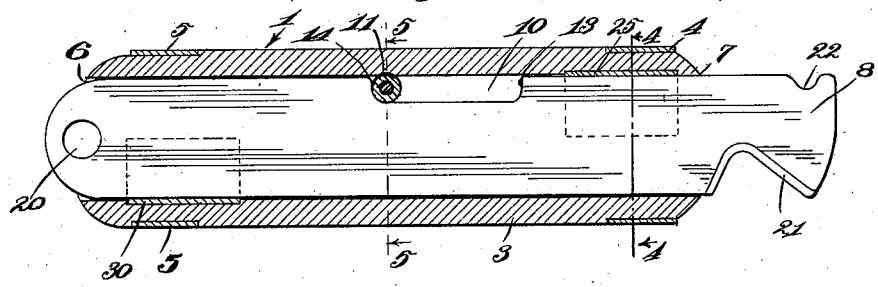
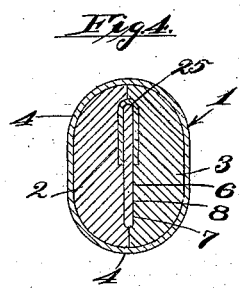
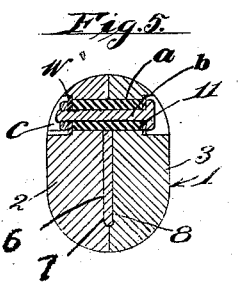
Inventor
H. E. Crum
By Hazard and Miller
Attorneys Patented Feb. 25, 1930

1,748,637

UNITED STATES PATENT OFFICE

HARVEY E. CRUM, OF SANTA MONICA, CALIFORNIA

ELECTRICIAN'S SAFETY KNIFE

Application filed December 29, 1926. Serial No. 157,697.

This invention relates to knives and more particularly to that class of knives which are adapted for use by electricians and the like for peeling and cleaning insulated electrical conductors.

An object of this invention is to provide a knife in which the metallic blade is completely insulated from the handle, so that the same may be used upon a wire which is charged without danger of transmitting electrical energy from the wire to the human body.

Another object of this invention is to provide a knife wherein the actual cutting blade is slidable within the handle and the same when not in use may be withdrawn into the handle, thereby preventing the knife from ripping the clothing of the user.

A further object of this invention is to provide a knife which may be hung upon the electrician's belt when the blade is concealed within the handle and which may be quickly removed from the belt and the knife blade exposed for use.

A still further object of this invention is to provide an electrician's knife which is extremely durable, which is very unlikely to get out of order and which will withstand heavy duty or rough treatment.

With the foregoing and other objects in view which will be made manifest in the following detailed description and specifically pointed out in the appended claims, reference is had to the accompanying drawings for an illustrative embodiment of the invention, wherein:

Figure 1 is a side elevation of my knife showing the blade exposed and ready for use, Fig. 2 is a longitudinal elevation taken from Fig. 1, the knife blade being shown on edge, Fig. 3 is a sectional view taken along the line 3—3 of Fig. 2, Fig. 4 is a sectional view taken along the line 4—4 of Fig. 3, and Fig. 5 is a sectional view taken along the line 5—5 of Fig. 3.

Referring to the accompanying drawings wherein similar reference characters designate similar parts throughout, 1 designates the handle member or casing in which my knife blade is enclosed. This casing is formed in two sections 2 and 3, as shown in Fig. 2. These sections at their ends are provided with reduced cut-away portions adapted to receive suitable straps 4 and 5, whereby the sections are held in abutting relation. Each of these sections has a longitudinal groove 6 therethrough, which grooves are in substantial alignment and when the sections are assembled form an elongated longitudinal slot designated at 7.

A knife blade 8 is adapted to fit tightly within the slot 7 so as to offer frictional resistance to the sides thereof. The knife blade is provided as at 10 with a cut-away portion, which cut-away portion is adapted to receive a stop 11. This stop comprises a tube of fiber or other insulating material which extends through the handle members 2 and 3. Cut-out portions $c$ are formed in the sides of the material, which cut-out portions communicate with apertures $a$ in the handle sections. A pair of washers $w$ are adapted to bear against the bottom of the cut-out portions and against the insulating material to hold the same in place and a threaded bolt $b$ extends through the insulating material and holds the same and the washers firmly in place.

The slot cut in the knife is defined by a pair of shoulders 13 and 14. The shoulders 13 and 14 together with the stop 11 are adapted to form means whereby the knife blade may have a limited sliding movement within the slot formed by the grooves 6. The knife blade 8 is slightly longer than the handle 1 and is provided at one end with an aperture 20 and at the other end with a sharpened cutting edge 21 and a second edge 22. The blade 21 may be used to cut insulation from a conductor while the blade 22 may be used for scraping the metallic conductor clean. A U-shaped member is shown at 25 and is likewise imbedded in the grooves 6 and is adapted to receive the thrust imparted to the knife blade from the cutting edge 21. A second U-shaped member 30 also imbedded in the grooves 6 serves to take up the leverage thrust imparted to the other end of the knife blade.

The blade 8 is securely held in slidable relation within the slot through the handle. A sharp blow on one end of the blade will serve to extend the other end of the blade outwardly from the handle so that the same may be used for cutting purposes. When no further services are required of the knife, a sharp blow on the cutting end will retract the blade into the handle and the other end of the same will be protruded, the aperture 20 serving as a support for the knife as an entirety so that the same may be hung upon a latch fastened to the electrician's belt. The handle member 1 is formed of wood or other suitable insulating material and it is obvious that no metallic contact is made through the knife blade through the handle. The knife may therefore be well adapted for use by an electrician in cutting wires carrying either high or low voltage.

It will be understood that various changes may be made in the detail of construction without departing from the scope and spirit of the invention as defined by the appended claims.

I claim:

1. A safety knife comprising in combination a handle and a blade, said handle being formed of complementary sections, there being aligned grooves in each of said sections adapted to form a slot therebetween, straps holding said sections in conjunctive relation, said blade being slidably mounted in said slot, whereby either end of said blade may be practically completely withdrawn into said slot and be disposed within its respective end thereof or protruding therefrom, said straps being insulated from said blade.

2. A safety knife comprising in combination a handle and a blade, said handle being formed of complementary sections, aligned grooves in each of said sections adapted to form a slot therebetween, straps holding said sections in conjunctive relation, said blade being slidably mounted in said slot, whereby either end of said blade may be practically completely withdrawn into said slot and be disposed within its respective end thereof or protruded therefrom, said handle presenting a surface every portion of which is electrically insulated from said blade.

3. A safety knife comprising in combination a handle and a blade, said handle being formed of complementary sections, aligned grooves in each of said sections adapted to form a slot therebetween, straps holding said sections in conjunctive relation, said blade being slidably mounted in said slot, whereby either end of said blade may be withdrawn into said slot and be disposed within its respective end thereof or protruded therefrom, said handle presenting a surface every portion of which is electrically insulated from said blade, and reinforcing means disposed within said slot adjacent both ends thereof adapted to take up the thrust on said blade.

4. A safety device comprising in combination a handle and a tool, said handle being formed of complementary sections, there being aligned grooves in each of said sections adapted to form a slot therebetween, straps holding said sections in conjunctive relation, said tool being slidably mounted in said slot whereby either end of said tool may be withdrawn into said slot and be disposed within its respective end thereof or protruded therefrom, said handle presenting a surface every portion of which is electrically insulated from said tool, and reinforcing means disposed within said slot adapted to take up the thrust on said tool.

5. An electrician's knife comprising a slotted handle, a blade slidable in the slot in the handle, said handle presenting an exterior surface which is entirely electrically insulated from the blade, and means extending transversely through the handle and through the blade for limiting the sliding movement of the blade within the slot but permitting either end of the blade to be retracted into the slot and remain disposed in its respective end thereof or projected therefrom, said means presenting an exterior surface on the outside of the handle which is electrically insulated from the plate.

6. An electrician's knife comprising a slotted handle, a blade slidable in the slot in the handle, said handle presenting an exterior surface which is entirely electrically insulated from the blade, and means extending transversely through the handle and through the blade for limiting the sliding movement of the blade within the slot but permitting either end of the blade to be retracted into the slot and remain disposed within its respective end thereof or projected therefrom, said means being electrically insulated from the blade.

In testimony whereof I have signed my name to this specification.

HARVEY E. CRUM.